(12) United States Patent
Russell, II et al.

(10) Patent No.: US 9,362,009 B2
(45) Date of Patent: Jun. 7, 2016

(54) CROSS-SECTION REDUCING ISOTOPE SYSTEM

(75) Inventors: William Earl Russell, II, Wilmington, NC (US); Christopher J. Monetta, Wilmington, NC (US); Russell Patrick Higgins, Wilmington, NC (US); Vernon W. Mills, Wilmington, NC (US); David Grey Smith, Leland, NC (US); Carlton Wayne Clark, Wilmington, NC (US); Michael S. DeFilippis, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 703 days.

(21) Appl. No.: 11/946,258

(22) Filed: Nov. 28, 2007

(65) Prior Publication Data

US 2009/0135983 A1    May 28, 2009

(51) Int. Cl.
*G21G 1/02* (2006.01)
*G21C 3/326* (2006.01)

(52) U.S. Cl.
CPC .......... *G21C 3/326* (2013.01); *G21G 1/02* (2013.01); *Y02E 30/38* (2013.01)

(58) Field of Classification Search
USPC ........................................................ 376/409
See application file for complete search history.

(56) References Cited

U.S. PATENT DOCUMENTS

| | | | |
|---|---|---|---|
| 3,291,699 A * | 12/1966 | Trickett et al. ................. | 376/423 |
| 3,654,467 A * | 4/1972 | Tittman et al. ................. | 376/163 |
| 3,940,318 A | 2/1976 | Arino et al. | |
| 3,998,691 A | 12/1976 | Shikata et al. | |
| 4,196,047 A | 4/1980 | Mitchem et al. | |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,681,732 A * | 7/1987 | Mallener et al. ............. | 376/337 |
| 4,729,903 A | 3/1988 | McGovern et al. | |
| 4,782,231 A | 11/1988 | Svoboda et al. | |

(Continued)

FOREIGN PATENT DOCUMENTS

| | | | |
|---|---|---|---|
| CN | 1064170 C | | 4/2001 |
| FR | 2647945 A | * | 12/1990 |

(Continued)

OTHER PUBLICATIONS

Machine Translation of JP 51101695.*

(Continued)

*Primary Examiner* — Sean P Burke (74) *Attorney, Agent, or Firm* — Harness, Dickey & Pierce, P.L.C.

(57) ABSTRACT

An isotope production target rod for a power generating nuclear reactor is provided. The isotope production target rod can include at least one rod central body including an outer shell that defines an internal cavity and a plurality of irradiation targets within the internal cavity. The irradiation targets can be positioned in a spatial arrangement utilizing a low nuclear cross-section separating medium to maintain the spatial arrangement.

17 Claims, 9 Drawing Sheets

(56) References Cited

U.S. PATENT DOCUMENTS

| | | | |
|---|---|---|---|
| 4,859,431 A | 8/1989 | Ehrhardt | |
| 5,053,186 A | 10/1991 | Vanderheyden et al. | |
| 5,145,636 A | 9/1992 | Vanderhevden et al. | |
| 5,355,394 A | 10/1994 | Van Geel et al. | |
| 5,400,375 A | 3/1995 | Suzuki et al. | |
| 5,416,813 A * | 5/1995 | Hiraiwa et al. | 376/419 |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 6,056,929 A | 5/2000 | Hassal | |
| 6,160,862 A | 12/2000 | Wiencek et al. | |
| 6,192,095 B1 | 2/2001 | Sekine et al. | |
| 6,233,299 B1 | 5/2001 | Wakabayashi | |
| 6,456,680 B1 | 9/2002 | Abalin et al. | |
| 6,678,344 B2 | 1/2004 | O'Leary et al. | |
| 6,751,280 B2 | 6/2004 | Mirzadeh et al. | |
| 6,804,319 B1 | 10/2004 | Mirzadeh et al. | |
| 6,895,064 B2 | 5/2005 | Ritter | |
| 6,896,716 B1 | 5/2005 | Jones, Jr. | |
| 7,157,061 B2 | 1/2007 | Meikrantz et al. | |
| 7,235,216 B2 | 6/2007 | Kiselev et al. | |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 * | 9/2003 | Filippone | 376/208 |
| 2004/0091421 A1 | 5/2004 | Aston et al. | |
| 2004/0105520 A1 | 6/2004 | Carter | |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 * | 6/2007 | Fawcett et al. | 376/202 |
| 2007/0133734 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |

FOREIGN PATENT DOCUMENTS

| | | | |
|---|---|---|---|
| JP | 51-101695 | | 9/1975 |
| JP | 51101695 A | | 9/1976 |
| JP | 51101695 A | * | 9/1976 |
| JP | 2006162613 A | | 6/2006 |
| JP | 2006162613 A | * | 6/2006 |
| RU | 2120669 C1 | | 10/1998 |
| RU | 2228553 C2 | | 5/2004 |

OTHER PUBLICATIONS

Manual for reactor produced radioisotopes, IAEA, Jan. 2003, pp. 1-11, See http://www-pub.iaea.org/MTCD/publications/PDF/te_1340_web.pdf.*

U.S. Appl. No. 11/002,680, filed Dec. 3, 2004, Fawcett et al.

U.S. Appl. No. 11/002,677, filed Dec. 3, 2004, Fawcett et al.

Li Manchang, Irradiation Utilization of Central Hole in Fuel Elements for HFETR, Chinese Academic Journal Electronic Publishing House, Aug. 31, 1990, Nuclear Power Engineering, vol. 1 1, No. 4, China.

Zhang Shougang, Production of Radioisotopes with HFETR, Chinese Academic Journal Electronic Publishing House, Jun. 30, 1985, Nuclear Power Engineering, vol. 6, No. 3, China.

Office Action issued in connection with CN Application No. 200810179633.8, Apr. 23, 2012.

Notice of Reason for Refusal dated Oct. 29, 2013 for corresponding Japanese Patent Application No. 2008-294019 with English Translation.

Notice of Reason for Refusal dated Mar. 13, 2013 for corresponding Taiwanese Patent Application No. 097144364 with English Translation.

Russian Office Action dated Nov. 29, 2012 for corresponding Russian Application No. 2008146953/06(061393)—full translation provided.

* cited by examiner

CROSS-SECTION REDUCING ISOTOPE SYSTEM

FIELD

The present disclosure relates generally to isotope production in light water power reactors.

BACKGROUND

A wide variety of radioactive isotopes are used for medical, industrial, research, and commercial applications. In general, radioisotopes may be produced by irradiating target isotope materials with nuclear particles. The target atoms either transmute directly into the desired isotope, or a radioisotope is produced through a chain of absorption and decay that subsequently generates the desired radioactive product.

Two different technologies are used to provide the source of radiation for radioisotope production: nuclear reactors, which produce a flux of neutrons; and particle accelerators or cyclotrons, which produce a flux of charged particles, usually protons, but sometimes electrons or other particles. For example, medical and industrial radioisotopes have been produced since 1957 by Canada's National Research Universal (NRU) reactor at the Atomic Energy of Canada's (AECL's) Chalk River Laboratories in Ontario, Canada. The NRU produces a high percentage of the world's medical and industrial radioisotopes, including molybdenum-99, a critical isotope used for medical diagnoses. Other exemplary radioisotopes used for medical, industrial, research and commercial applications include thallium-201, which is used for medical cardiac imaging; calcium-44, which is used in bone growth studies; iridium-192, which is used for nondestructive testing of construction and other materials; cobalt-60, which is used to destroy cancer cells, to disinfect surgical equipment and medications, and the sterilization of food supplies; thulium-170, which is used for portable blood irradiations for leukemia, lymphoma treatment, and power source; gadolinium-153, which is used for osteoporosis detection and SPECT imaging; nickel-63, which can be used for the creation of long-life batteries; and americium-241, which is used in smoke detectors.

In general, specimen rods containing an isotope target are inserted through penetrations in the NRU in a continuous process and subject to irradiation therein, so as to produce isotopes at a desired specific activity for use in nuclear medicine and/or industrial applications. The isotope targets are then irradiated during operation of the power generating nuclear reactor. After irradiation, the radioisotope is recovered from the target and used for preparing various radiopharmaceuticals for nuclear medical procedures.

BRIEF SUMMARY

According to various aspects, an isotope production target rod for a power generating nuclear reactor is provided. In various embodiments, the isotope production target rod includes at least one rod central body including an outer shell that defines an internal cavity. The isotope production target rod can additionally include a plurality of irradiation targets within the internal cavity. In various implementations, the irradiation targets are positioned in a spatial arrangement utilizing a low nuclear cross-section separating medium to maintain the spatial arrangement.

In various other embodiments the isotope production target rod can include at least one rod central body including an outer shell that defines an internal cavity and an irradiation target canister within the internal cavity of each respective rod central body. The isotope production target rod additionally includes a plurality of irradiation targets positioned within each respective irradiation target canister in a spatial arrangement utilizing a low nuclear cross-section separating medium to maintain the spatial arrangement.

In still other embodiments the isotope production target rod can include at least one rod central body including an outer shell that defines an internal cavity, an irradiation target canister within the internal cavity of each respective rod central body, and at least one irradiation target receptacle within each respective irradiation target canister. In various implementations, each irradiation target receptacle can include a plurality of target reservoirs in a pattern within at least a portion of an outer surface of each irradiation target receptacle.

According to other aspects, a fuel bundle for a nuclear power reactor is provided. In various embodiments the fuel bundle can include a plurality of fuel rods and at least one isotope production target rod. Each isotope production target rod can include at least one rod central body including an outer shell that defines an internal cavity, and a plurality of irradiation targets within the internal cavity. The irradiation targets are positioned in a spatial arrangement utilizing a low nuclear cross-section separating medium to maintain the spatial arrangement.

According to yet other aspects, a method for producing isotopes in a nuclear power reactor is provided. In various embodiments, the method can include sealing a plurality of irradiation targets within an irradiation target canister. More particularly, the irradiation targets are positioned within the canister in a spatial arrangement utilizing a low nuclear cross-section material to maintain the irradiation targets in the spatial arrangement. The method can additionally include sealing the irradiation target canister within an internal cavity of an isotope production target rod, and including the isotope production target rod within a nuclear power reactor fuel bundle.

Further areas of applicability of the present disclosure will become apparent from the detailed description provided hereinafter. It should be understood that the detailed description and specific examples, while indicating the various embodiments of the disclosure, are intended for purposes of illustration only and are not intended to limit the scope of the disclosure. Furthermore, the features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of various exemplary embodiments is merely exemplary in nature and is in no way intended to limit the disclosure, its application or uses. Additionally, the advantages provided by the various embodiments, as described below, are exemplary in nature and not all embodiments provide the same advantages or the same degree of advantages.

Figure 1:
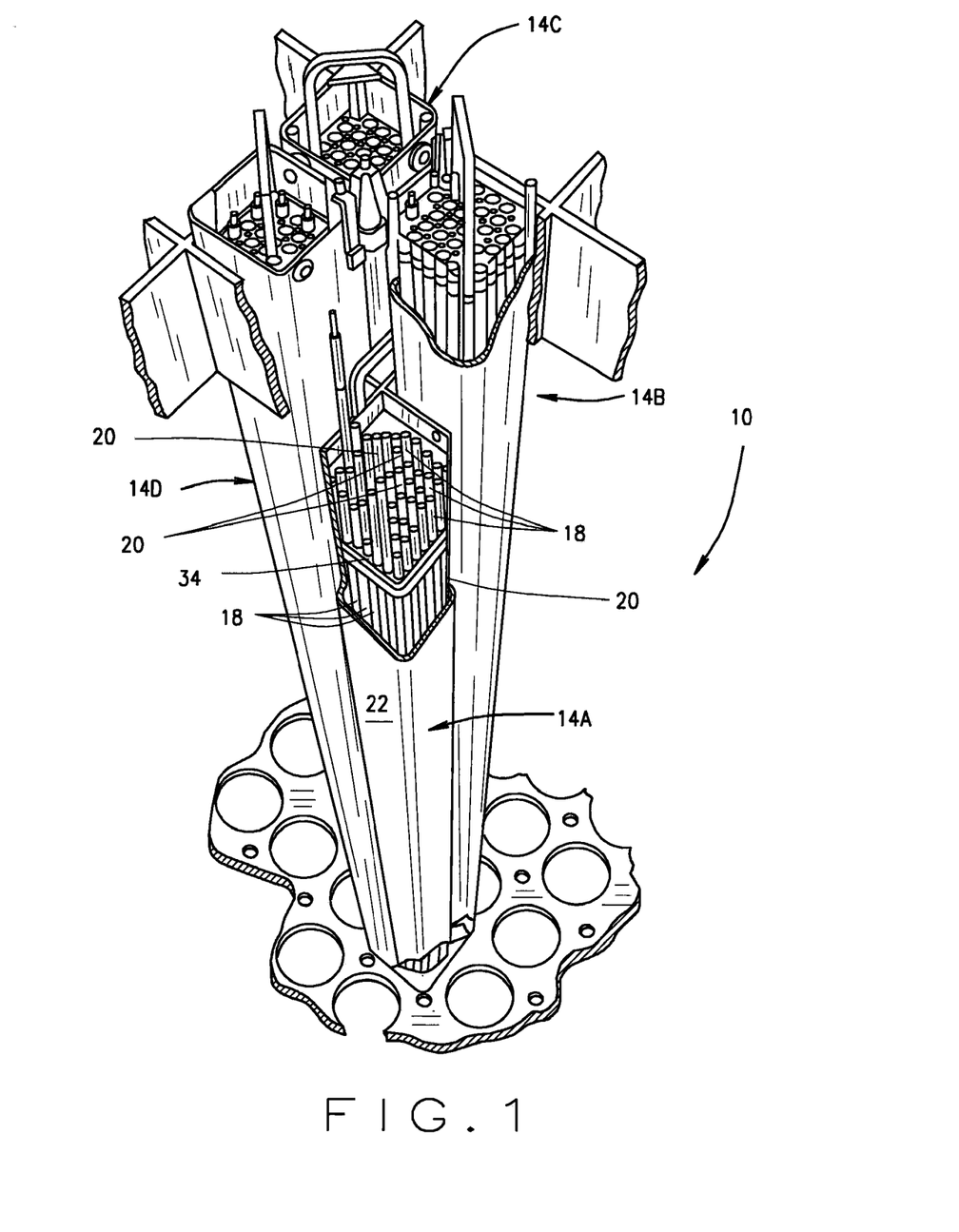
FIG. 1 is a perspective sectional view of a portion of a nuclear reactor core illustrating a plurality of fuel bundle assemblies including fuel rods, isotope production target rods, tie plates, spacer grids and channels, in accordance with various embodiments of the present disclosure.

Referring to FIG. 1, a perspective sectional view of an exemplary portion of a power generating nuclear reactor core 10, e.g., a portion of a boiling water nuclear reactor core, is provided. The exemplary portion of the power generating nuclear reactor core 10 includes four fuel bundle assemblies 14A, 14B, 14C and 14D through which, and around which, a liquid moderator, i.e., a coolant, flows when the fuel bundles 14A, 14B, 14C and 14D are installed and the reactor is functioning. For brevity, the fuel bundle assemblies 14A, 14B, 14C and 14D will simply be referred to herein as fuel bundles 14A, 14B, 14C and 14D. Nuclear reactions within each fuel bundle 14A, 14B, 14C and 14D generate heat used to convert the coolant to steam that is used to generate electrical power. Each fuel bundle 14A, 14B, 14C and 14D is substantially the same in structure, form and function. Thus, for simplicity and clarity, only fuel bundle 14A will described herein.

Figure 2:
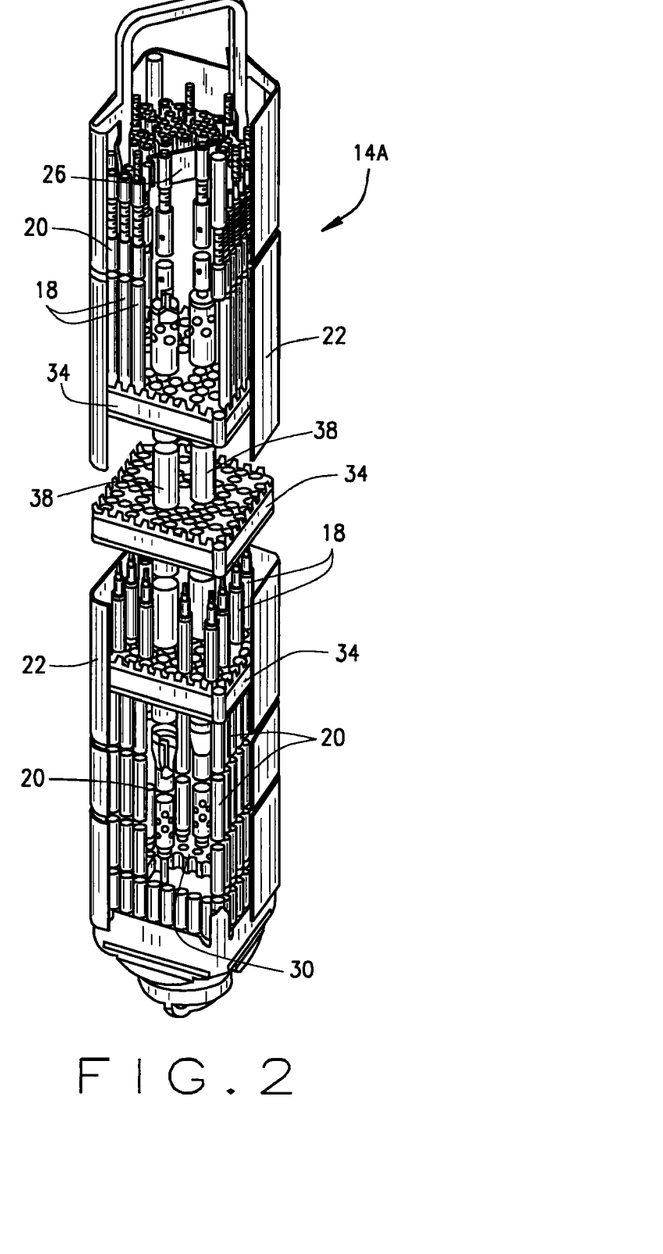
FIG. 2 is a partially exploded sectional view of an exemplary fuel bundle assembly included in the portion of a nuclear reactor core shown in FIG. 1, in accordance with various embodiments of the present disclosure.

Referring also to FIG. 2, the fuel bundle 14A generally includes an outer channel 22 surrounding an upper tie plate 26 and a lower tie plate 30. A plurality of fuel rods 18 are arranged in an array within the fuel bundle 14A and pass through a plurality of spacer grids 34 longitudinally, or axially, spaced one from the other along the length of the fuel bundle 14A. The fuel rods 18, and typically one or more water rods 38, are maintained in spaced relation, i.e., an array, to each other within the fuel bundle 14A by the spacer grids 34 so as to define passages for the reactor coolant flow between fuel rods 18. Generally, the fuel bundle can include any number of spacer grids 34 spaced along the entire axial length of the fuel bundle 14A as needed for maintaining the fuel rods 18 in the desired array, e.g., three to eight spacer grids 34.

In various embodiments, the fuel bundle 14A can include one or more isotope production target rods 20. Generally, the fuel rods 18 contain nuclear fuel, e.g., uranium, that produces a neutron flux, while the isotope production target rods 20 contain irradiation targets that are irradiated by the neutron flux to produce a desired radioisotope. The irradiation targets can be fabricated of any desired isotope such as cadmium, cobalt, iridium, nickel, thallium, etc. The fuel and isotope production target rods 18 and 20 can have substantially the same construction with the exception of fuel rods 18 containing nuclear fuel and the isotope production target rods 20 containing the irradiation targets. However, only the construction, function, components, elements, assemblies, features, attributes, etc., of the isotope production target rods 20 will be further described below.

Figure 3:
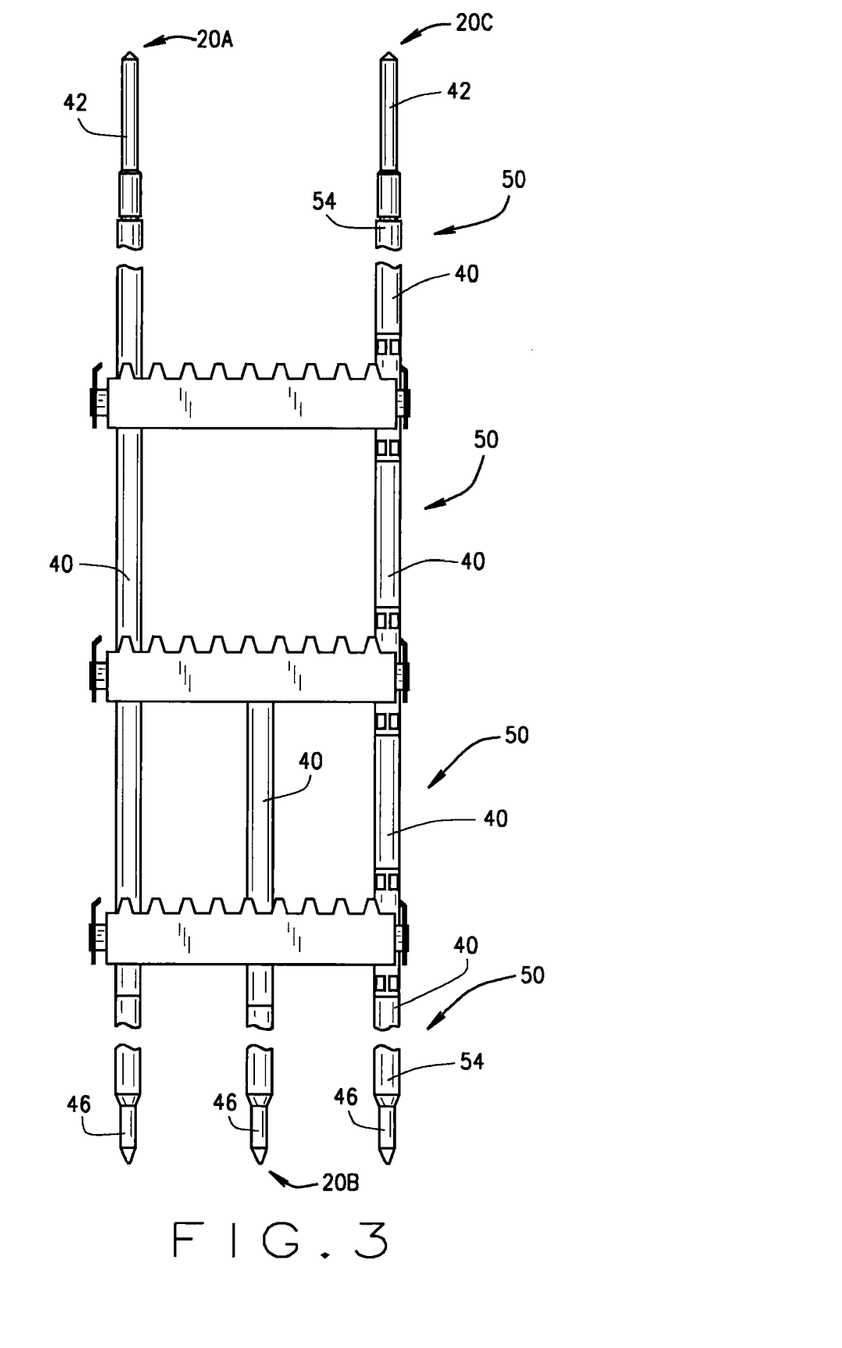
FIG. 3 illustrates various isotope production target rods that can be included within the fuel bundle assembly shown in FIG. 2, in accordance with various embodiments of the present disclosure.

Referring now to FIG. 3, in various embodiments, the isotope production target rods 20 can be full length rods, part length rods, multi-segment rods or any combination thereof. For example, the fuel bundle 14A can include one or more full length isotope production target rods 20A, one or more part length isotope production target rods 20B, one or more multi-segment isotope production target rods 20C, or any combination thereof. Each isotope production target rod 20, e.g., isotope production target rods 20A, 20B and 20C, generally includes at least one central body 40 coupled at an upper end to an upper end cap 42 and/or coupled at a lower end to a lower end cap 46. The upper and lower end caps 42 and 46 mate with the respective upper and lower tie plates 26 and 30 to stabilize the ends of each isotope production target rod 20, e.g., rods 20A, 20B and/or 20C, within the channel 22.

More particularly, each full length isotope production target rod 20A includes a central body 40 having an axial length extending approximately the length of fuel bundle 14A and coupled at the upper and lower ends to the upper and lower end caps 42 and 46. Each part length isotope production target rod 20B includes a central body 40 having an axial length that is less than the approximate length of the fuel bundle 14A. For example, the central body 40 of each part length isotope production target rod 20B can be ¾, ½, ¼, etc., the approximate length of the fuel bundle 14A. The central body 40 of each part length isotope production target rod 20B is coupled at a lower end to a lower end piece 46. The lower end pieces 46 mate with the respective tie plate 30 to stabilize the end of each isotope production target rods 20 within the channel 22.

Figure 4:
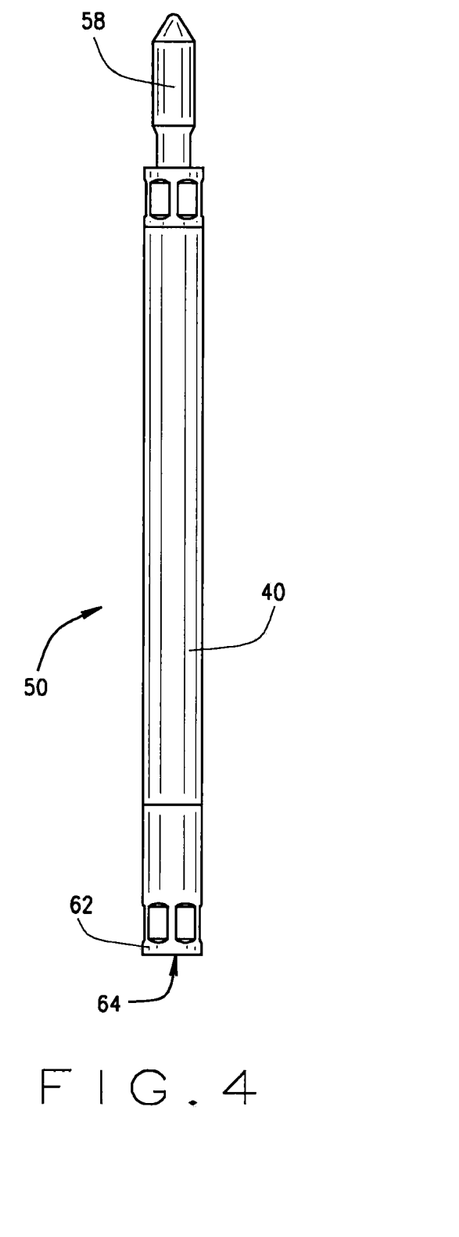
FIG. 4 is an exemplary illustration of an isotope production target rod segment included in a multi-segment isotope production target rod of the fuel bundle assembly shown in FIG. 2, in accordance with various embodiments of the present disclosure.

Referring now to FIGS. 3 and 4, each multi-segment isotope production target rod 20C includes a plurality of rod segments 50 that are interconnected such that the multi-segment isotope production target rod 20C can have an axial length substantially equal to the length of fuel bundle 14A or any incremental shorter length, e.g., a part length isotope production target rod 20B. Each isotope production target rod segment 50 includes a central body 40 such that the aggregated isotope production target rod 20C comprises a plurality of central bodies 40. In various embodiments, each rod segment 50 includes a male connector 58 connected to a first end and a female receptacle 62 having an internal bore 64 connected to an opposing second end. The male connector 58 and female receptacle 62 are mateable to interconnect the respective rod segments 50. Additionally, the distal ends 54 of the upper-most and lower-most rod segments 50 are respectively coupled to the upper and lower end caps 42 and 46.

Referring to FIG. 4, as described above, each multi-segment isotope production target rod 20C includes a plurality of interconnected rod segments 50. It should be understood that the various rod segments 50 can have different axial, or longitudinal, lengths and different outside diameters, and remain within the scope of the present disclosure. Thus, each multi-segment isotope production target rod 20C can be assembled to have a desired length and one or more outside diameters along the length of the aggregated isotope production target rod 20C by interconnecting various length and diameter rod segments 50. Therefore, it should be understood that FIG. 4 illustrates an exemplary isotope production target rod segment 50 and the accompanying description herein relates to each rod segment 50 of each multi-segment isotope production target rod 20C, regardless of the length and/or diameter of each respective rod segment 50.

Figure 5:
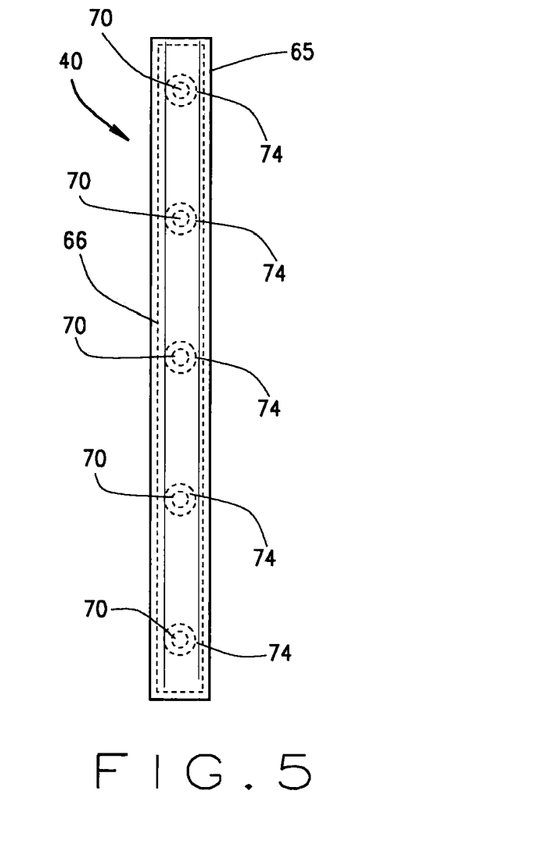
FIG. 5 is an exemplary illustration of a central body included in each of the isotope production target rods shown in FIG. 4, in accordance with various embodiments of the present disclosure.

Referring now to FIG. 5, an exemplary illustration of the one or more central bodies 40 included in each of the isotope production target rods 20 shown in FIG. 3 is provided, in accordance with various embodiments of the present disclosure. More particularly, the central body 40 shown in FIG. 5 and the accompanying description relates to each central body 40 of each full length isotope production target rod 20A, each part-length isotope production target rod 20B and each rod segment 50 of each multi-segment isotope production target rod 20C.

Each central body 40 of each isotope production target rod 20 includes an outer shell 65 that defines an internal cavity 66 for retaining a plurality of irradiation targets 70. The cavity 66 is accessible prior to the upper and lower end caps 42 and 46 (shown in FIG. 3) and/or the male connector 58 and/or the female receptacle 62 (shown in FIG. 4) being connected to the opposing ends of the respective central body 40. In various embodiments, described below, the irradiations targets 70 are positioned and retained within the cavity 66 in a particular spatial arrangement utilizing a low nuclear cross-section separating medium 74. More specifically, through empirical data and/or mathematical modeling and/or other suitable testing means, a spatial arrangement of the irradiation targets can be designed to optimize absorption by the irradiation targets 70 of neutrons generated by the fuel bundles 14 within the power generating nuclear reactor core 10.

Furthermore, in various implementations, the separating medium 74 is constructed of, fabricated from or comprises a low nuclear cross-section material, substance, gas, etc., that is substantially invisible to neutrons, i.e., has a very low or substantially negligible absorption rate of neutrons. For example the separating medium can be fabricated of zirconium, aluminum or any other suitable material, substance, gas, etc., that has a low nuclear cross-section. Thus, the neutrons pass through the separating medium 74 without being absorbed such that the neutron flux within the power generating nuclear reactor core 10 is not inhibited and the power generation efficiency of the respective reactor is not diminished. More specifically, the particular spatial arrangement of the irradiation targets 70 and the low nuclear cross-section of the separating medium 74 minimize the impact of the isotope production target rods 20 on energy generation of the power generating nuclear reactor core 10 while maximizing the specific activity, i.e., neutron absorption, of the irradiation targets 70.

Figure 6:
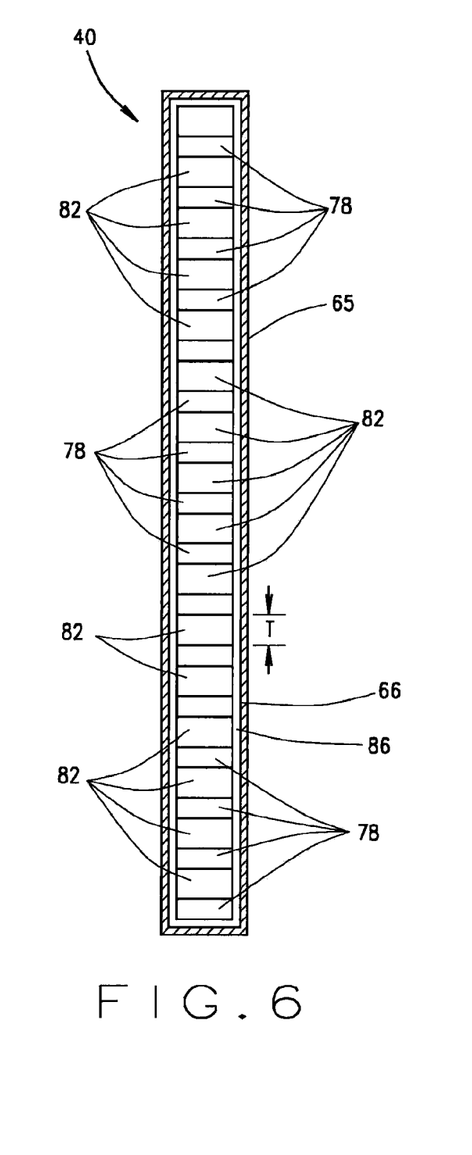
FIG. 6 is an exemplary longitudinal cross-sectional view of the central body shown in FIG. 5, illustrating a plurality of irradiation targets positioned within a cavity of the central body in a predetermined spatial arrangement by a low nuclear cross-section medium, in accordance with various embodiments of the present disclosure.

FIG. 6 provides a cross-sectional view of an exemplary central body 40 illustrating a plurality of irradiation target disks 78 and target spacers 82 positioned within the cavity 66, of the respective central body 40, in accordance with various embodiments of the present disclosure. In various embodiments, the irradiation targets 70 can comprise disks or wafers 78 fabricated of the desired isotope, e.g., cobalt, and the separating medium 74 can comprise a plurality of irradiation target spacers 82 positioned between each adjacent irradiation target disk 78. Each spacer 82 has a thickness T selected to position the irradiation target disks 78 in the spatial arrangement predetermined to provide the optimal absorption of neutrons by the irradiation target disks 78. For example, in various implementations, the spacers 82 can have the same thickness T such that each irradiation target disk 78 is equally spaced from all adjacent irradiation target disks 78, i.e., equally spaced from the irradiation disk 78 directly above and below each respective irradiation target disk 78. Additionally, as described above, the separating medium 74, i.e., the spacers 82, can be fabricated from a low nuclear cross-section material such as zirconium or aluminum. Therefore, the spacers 82 provide a low nuclear cross-section separating medium and spacing of the irradiation target disks 78 designed to minimize the energy impact of the isotope production target rods 20 on the power generating nuclear reactor core 10 while maximizing the neutron absorption of the irradiation target disks 78.

In various embodiments, the irradiation target disks 78 and spacers 82 are sized such that an interstitial space 86 can exist between an inner wall of the cavity 66 and irradiation target disks 78 and spacers 82. The interstitial space 86 allows for thermal expansion of the irradiation target disks 78 and the spacers 82. In various implementations, the interstitial space 86 and any space existing between the target disks 78 and spacers 86 can be backfilled with a substantially zero nuclear cross-section, high thermal conductivity gas, such as helium. Thus, the substantially zero nuclear cross-section, high thermal conductivity gas presents substantially no impedance to the neutron flux of the power generating nuclear reactor core 10 while providing high thermal conductivity to remove heat from the irradiation target disks 78 and spacers 82 of the respective central body 40. Although FIG. 6 illustrates essentially the entire cavity 66 being filled with irradiation target disks 78 and spacers 82, it should be understood that less than the entire cavity 66 can be filled with irradiation target disks 78 and spacers 82 and remain within the scope of the present disclosure.

Figure 7:
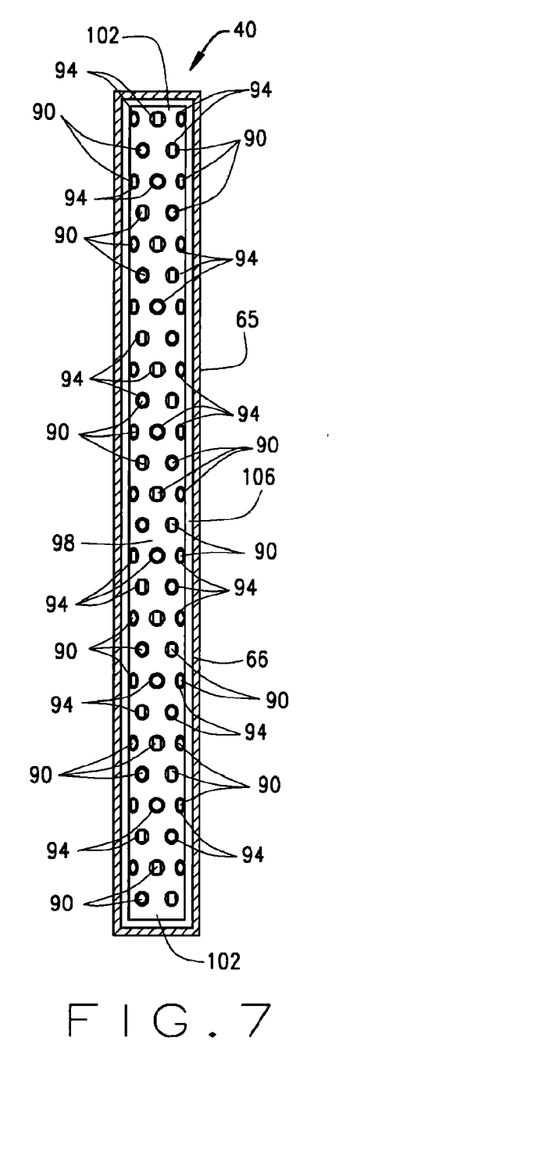
FIG. 7 is an exemplary longitudinal cross-sectional view of the central body shown in FIG. 5, illustrating a plurality of irradiation targets positioned within a cavity of the central body in a predetermined spatial arrangement by a low nuclear cross-section medium, in accordance with various other embodiments of the present disclosure.

FIG. 7 provides a cross-sectional view of an exemplary central body 40 illustrating a plurality of irradiation target pellets 90 retained with a plurality of reservoirs 94 within a target receptacle 98 positioned within the cavity 66, in accordance with various embodiments of the present disclosure. In various embodiments, the irradiation targets 70 can comprise the target pellets 90 fabricated of the desired isotope, e.g., cobalt, and the separating medium 74 can comprise the target receptacle 98 having the reservoirs 94 strategically positioned along at least a portion of an outer surface of the target receptacle 98.

More particularly, the reservoirs 94 are strategically located along the outer surface of the target receptacle 98 to position the irradiation target pellets 90 in the spatial arrangement predetermined to provide the optimal absorption of neutrons by the irradiation target pellets 90. For example, in various implementations, the target reservoirs 94 are equally spaced around the target receptacle 98 outer surface between opposing axial end portions 102 such that each target reservoir 94 is a substantially equal distance, e.g., 1 mm, 2 mm or 3 mm, from each adjacent target reservoir 94. As described above, the separating medium 74, i.e., the target receptacle 98, can be fabricated from low nuclear cross-section material such as zirconium or aluminum. Therefore, the low nuclear cross-section target receptacle 98 and spacing of the target receptacles 94 are designed to minimize the energy impact of the isotope production target rods 20 on the power generating nuclear reactor core 10 while maximizing the neutron absorption of the irradiation target pellets 90.

In various embodiments, the target receptacle 98 is sized such that an interstitial space 106 can exist between an inner wall of the cavity 66 and target receptacle 98. The interstitial space 106 allows for thermal expansion of the irradiation target pellets 90 and the target receptacle 98. In various implementations, the interstitial space 106 and any space between the target pellets 90 and the reservoirs 94 can be backfilled with a substantially zero nuclear cross-section, high thermal conductivity gas, such as helium. Thus, the substantially zero nuclear cross-section, high thermal conductivity gas presents substantially no impedance to the neutron flux of the power generating nuclear core 10 while providing high thermal conductivity to remove heat from the irradiation target pellets 90 and target receptacle 98.

Although the irradiation target pellets 90 are shown to be generally cylindrical in shape, it is envisioned that the irradiation target pellets 90 could have any shape suitable to fit within the target reservoirs 94. For example, in various embodiments, the target pellets 90 can be spherical, oblong, pyramidal, cubic, rectangular, etc.

Figure 8:
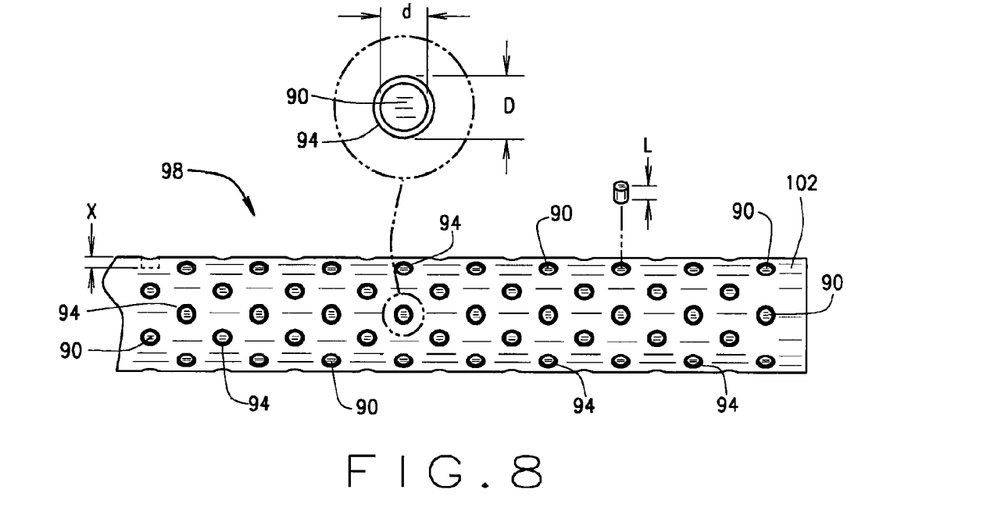
FIG. 8 is an exemplary illustration of an irradiation target receptacle shown in FIG. 7, in accordance with various embodiments of the present disclosure.
Figure 9:
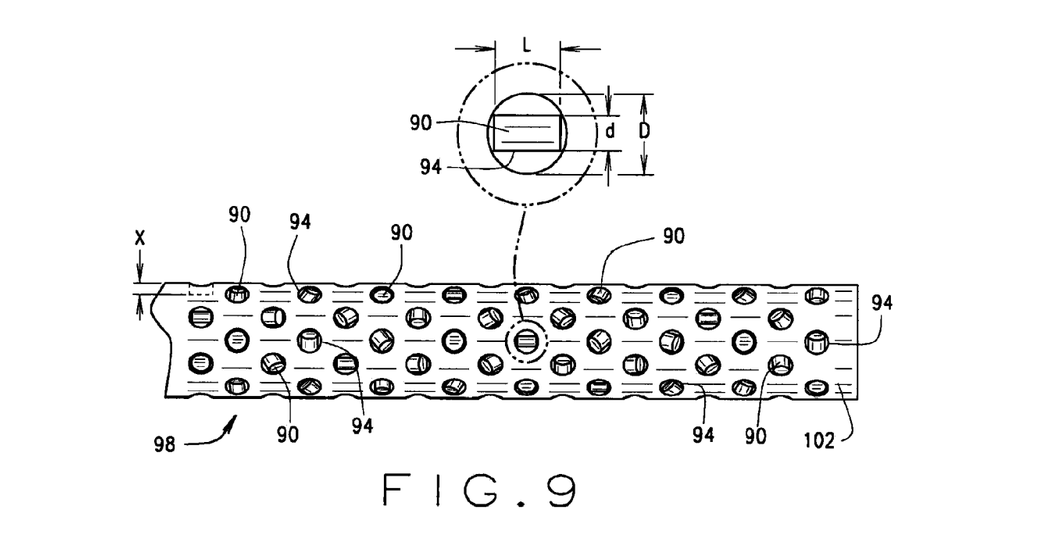
FIG. 9 is an exemplary illustration of an irradiation target receptacle shown in FIG. 7, in accordance with various other embodiments of the present disclosure.

Referring now to FIGS. 8 and 9, in various embodiments, the target reservoirs 94 of each target receptacle 98 are sized to retain a single irradiation target pellet 90. More particularly, in various implementations, the target reservoirs 94 can be sized to retain the respective irradiation target pellet 90 in a particular orientation (FIG. 8), while in other implementations, the target reservoirs 94 can be sized to retain the respective irradiation target pellet 90 in a random orientation (FIG. 9). For example, as illustrated in FIG. 8, each irradiation target pellet 90 can be cylindrical, oblong, rectangular, etc., or any shape having an axial length L that is greater than an outside diameter d of each respective target pellet 90. Additionally, an outside diameter d of each irradiation target pellet 90 is slightly smaller than an inside diameter D of target reservoirs 94, which is smaller than the length L of the irradiation target pellets 90. Therefore, each irradiation target pellet 90 will only fit within each respective target reservoir 94 having an axial center line of each irradiation target pellet 90 coaxially aligned with an axial center line of the respective target reservoir 94.

However, in other embodiments, as illustrated in FIG. 9, each target reservoir 94 has in inside diameter D that is slight greater than the longer of an axial length L and an outside diameter d of the irradiation target pellets 90, which can have generally any shape. Accordingly, only a single irradiation target pellet 90 can be retained within each target reservoir 94, but the irradiation target pellets 90 can be retained within the respective target reservoirs 94 in any random orientation. For example, in various implementations, the irradiation target pellets 90 can be cylindrical in shape wherein the axial length L of each irradiation target pellet 90 is approximately 1.25 times the diameter d of each irradiation pellet 90, and the diameter D of the target reservoirs 94 is approximately 1.5 times the diameter d of each irradiation pellet 90. Thus, the cylindrical irradiation target pellets 90 can be retained within the respective target reservoirs 94 in any orientation, and each target reservoir 94 is only large enough to retain a single irradiation pellet 90.

Figures 10, 11:
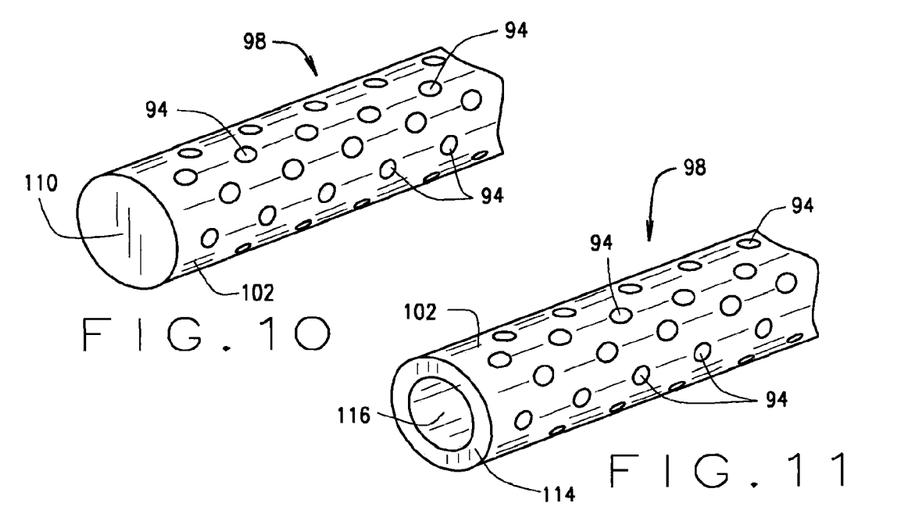
FIG. 10 illustrates the fabrication of the irradiation target receptacles shown in FIGS. 8 and 9, in accordance with various embodiments of the present disclosure.
FIG. 11 illustrates the fabrication of the irradiation target receptacles shown in FIGS. 8 and 9, in accordance with various other embodiments of the present disclosure.

Each target receptacle 98 can be fabricated in any suitable manner that will provide each target reservoirs 94 with substantially the same dimensions, i.e., the same depth X (shown in FIG. 9) and diameter D. For example, as illustrated in FIG. 10, in various embodiments, each irradiation target receptacle 98 can be fabricated to have a solid body. The target reservoirs 94 can be milled, drilled or bored in solid body 110 in the predetermined pattern along at least a portion of an outer surface of the solid body 110 to have substantially the same depth X and diameter D (shown in FIGS. 8 and 9). Alternatively, as illustrated in FIG. 11, in other embodiments, each irradiation target receptacle 98 can be fabricated to have a tubular body 114 with a longitudinal center cavity 116 therethrough. The target reservoirs 94 can be milled, drilled or bored in tubular body 114 in the predetermined pattern along the at least a portion of an outer surface of the tubular body 114 to have substantially the same depth X and diameter D (shown in FIGS. 8 and 9). The longitudinal center cavity 116 reduces the amount of mass, i.e., material, of the target receptacle 98, thereby reducing the nuclear cross-section. Additionally, the longitudinal center cavity 116 can be backfilled with a substantially zero nuclear cross-section, high thermal conductivity gas, such as helium, along with the interstitial space 106, thereby providing increased thermal conductivity to remove heat from the irradiation target pellets 90 and target receptacle 98, as described above.

Figure 12:
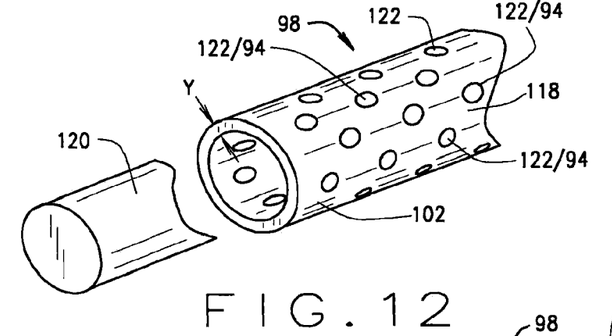
FIG. 12 illustrates the fabrication of the irradiation target receptacles shown in FIGS. 8 and 9, in accordance with yet other embodiments of the present disclosure.

Or, in still other embodiments, as illustrated in FIG. 12, each irradiation target receptacle 98 can be fabricated to include a perforated tubular sleeve 118 and a solid core 120 fitted within the tubular sleeve 118. The tubular sleeve 118 is fabricated to have a substantially constant thickness Y and to include a plurality of holes 122 therein in the predetermined pattern, wherein each hole 122 has substantially the same diameter D (shown in FIG. 9). Accordingly, when the solid core 120 is fitted into the perforated tubular sleeve 118, the target reservoirs 94 will be formed to have substantially the same depth X, equal to the tubular sleeve thickness Y, and diameter D (shown in FIG. 9).

Figure 13:
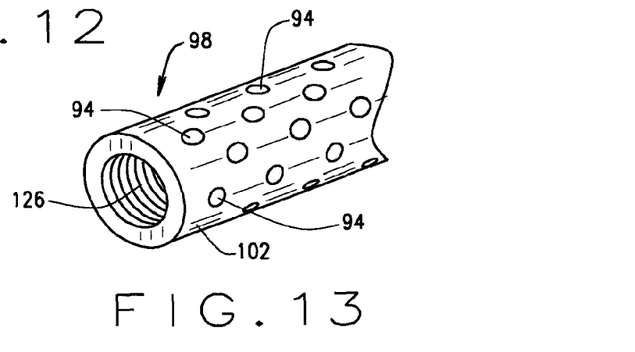
FIG. 13 is an exemplary illustration of a section of an irradiation target receptacles shown in FIGS. 8 through 12 having an internal threaded bore in at least one end, in accordance with various embodiments of the present disclosure.

Referring now to FIG. 13, in various embodiments, at least one of the opposing axial end portions 102 of each irradiation target receptacle 98 includes an axial threaded bore 126. The threaded bore provides a means to connect the respective irradiation target receptacle 98 to a target pellet loading and/or unloading device (not shown) during loading and/or unloading of the irradiation target pellets 90 into and/or out of the target reservoirs 94. In embodiments such at that shown in FIG. 11, wherein the irradiation target receptacle is fabricated to have the tubular body 114 and longitudinal center cavity 116, at least a portion of at least one end of the longitudinal center cavity 116 can include threads for connecting the respective irradiation target receptacle 98 to a pellet loading and/or unloading device.

Figure 13A:
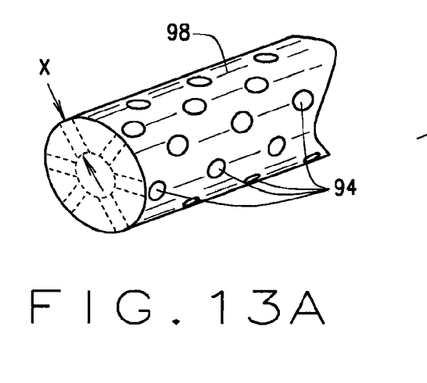
FIG. 13A is an exemplary illustration of the irradiation target receptacles shown in FIGS. 8 through 12 including irradiation target receptacles formed to have a depth sufficient to retain two or more irradiation target pellets, in accordance with various embodiments of the present disclosure.

Referring now to FIG. 13A, in various embodiments, one or more of the irradiation target receptacles 98 can be fabricated such that the target reservoirs 94 have a depth X suitable to retain two or more irradiation target pellets 90. More particularly, each target reservoir 94 has a depth X such that the each respective target reservoir 94 retain two or more irradiation target pellets 90 but will not intersect or penetrate any adjacent radially, or circumferentially, aligned target reservoirs 94. Similar to the embodiments described above with regard to FIGS. 8 through 13, each target reservoirs 94 can be sized to retain the respective two or more irradiation target pellets 90 in a particular orientation, e.g., coaxially aligned with a center axis of each respective target reservoir 94 (FIG. 8), or the target reservoirs 94 can be sized to retain the respective two or more irradiation target pellets 90 in a random orientation (FIG. 9). Additionally, the target receptacle 98 can be fabricated in the same manner as described above with regard to FIGS. 11 and 12 such that the depth X of each target reservoir 94 is deep enough to retain two or more irradiation target pellets 90. Furthermore, in various embodiments, the target receptacle 98 can be fabricated to include a threaded center bore 126, as described and illustrated in FIG. 11, and also to include the target reservoirs 94 having a depth X of sufficient to retain two or more irradiation target pellets 90.

Figure 13B:
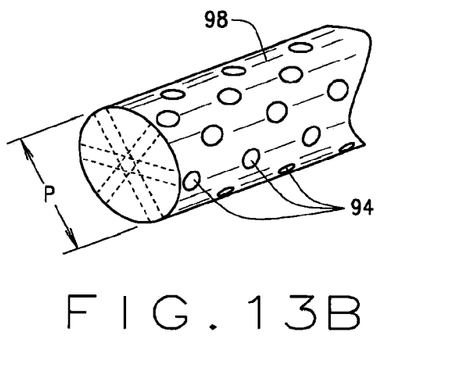
FIG. 13B is an exemplary illustration of the irradiation target receptacles shown in FIGS. 8 and 9 including irradiation target receptacles formed as diametrical bores extending through the respective target receptacle suitable for retaining a plurality of irradiation target pellets, in accordance with various embodiments of the present disclosure.

Referring now to FIG. 13B, in various embodiments, one or more of the irradiation target receptacles 98 can be fabricated such that the target reservoirs 94 are formed as bores extending through a diameter P of the irradiation target receptacles 98. Accordingly, each radially, or circumferentially, aligned target reservoir 94 bore will intersect at an axial center of the respective irradiation target receptacles 98. Each target reservoir 94 bore is, thus, suitable to retain a plurality, e.g., two or more, irradiation target pellets 90. Similar to the embodiments described above with regard to FIGS. 8 through 13, each target reservoirs 94 can be sized to retain the respective plurality of irradiation target pellets 90 in a particular orientation, e.g., coaxially aligned with a center axis of each respective target reservoir 94 bore (FIG. 8), or the target reservoirs 94 can be sized to retain the respective two or more irradiation target pellets 90 in a random orientation (FIG. 9).

Figure 14A:
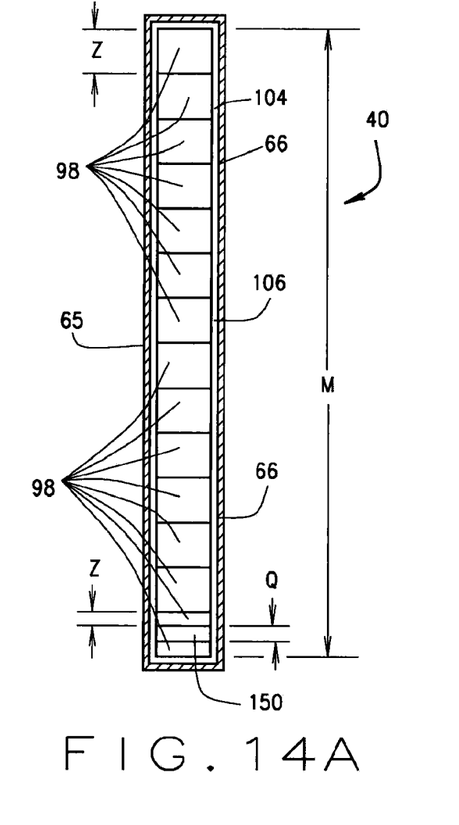
FIG. 14A is an exemplary illustration of an irradiation target receptacle shown in FIG. 7, in accordance with various embodiments of the present disclosure.
Figure 14B:
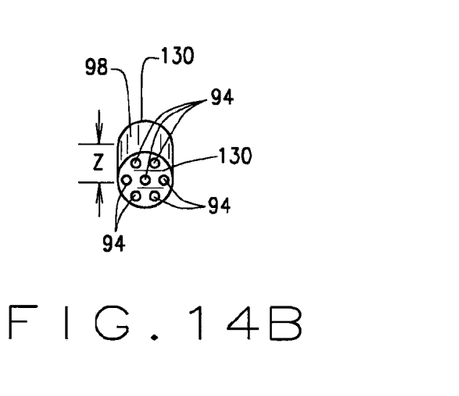
FIG. 14B is an exemplary longitudinal cross-sectional view of the central body, shown in FIG. 5, including a plurality of the irradiation target receptacles shown in FIG. 14A, in accordance with various other embodiments of the present disclosure.

Referring now to FIGS. 14A and 14B, FIG. 14A illustrates an irradiation target receptacle 98, in accordance with various embodiments, and FIG. 14B provides a cross-sectional view of an exemplary central body 40 including a plurality of the irradiation target receptacles 98, shown in FIG. 14A, in accordance with various embodiments of the present disclosure. In various implementations, the irradiation target receptacle 98 can have an axial length Z that is incrementally shorter than the axial length M of the internal cavity 66 such that a plurality of target receptacles 98 can be positioned within the cavity 66. In such embodiments, each target receptacle 98 can include the irradiation target reservoirs 90 strategically positioned along the outer surface of the respective target receptacle 98, as shown and described with reference to FIGS. 7, 8 and 9. Or, in alternative implementations, the target reservoirs 94 can be strategically positioned about at least one of opposing axial ends 130 of the respective target receptacle 98, as shown in FIG. 14A. The target reservoirs 94 formed within at least one of the opposing axial ends 130 can be sized to retain the respective irradiation target pellets 90 in a particular orientation, e.g., coaxially aligned with a center axis of each respective target reservoir 94. Or, the target reservoirs 94 formed within at least one of the opposing axial ends 130 can be sized to retain the respective irradiation target pellets 90 in a random orientation. In other implementations, the target receptacles 98 can include the target reservoirs 94 strategically positioned about at least one of the opposing axial ends 130 and along the outer surface of the respective target receptacle 98.

The axial length Z of each irradiation target receptacle 98 can be any suitable length sufficient to include irradiation target reservoirs 94 sized to retain one or more irradiation targets 90 (not shown). For example, the target receptacles 98 can have an axial length Z of approximately $1/16$ of an inch, $2/16$ of an inch, or greater. Additionally, in various embodiments, low nuclear cross-section spacers 150 can be disposed between adjacent target receptacles 98. Each spacer 150 has a thickness Q selected to position the target receptacles 98 in a desired spatial arrangement predetermined to provide the optimal absorption of neutrons by the irradiation target pellets 90 (not shown).

Accordingly, it is envisioned that the plurality of target receptacles 98 within the exemplary central body 40 shown in FIG. 14B can comprise one or more target receptacles 98 (FIG. 14A) having the target reservoirs 94 strategically positioned about at least one of the opposing axial ends 130, one or more target receptacles 98 having the target reservoirs 94 strategically positioned along the outer surface of the respective target receptacle 98, one or more target receptacles 98 having the target reservoirs 94 strategically positioned about at least one of the opposing axial ends 130 and along the outer surface of the respective target receptacle 98, or any combination thereof.

Figure 15A:
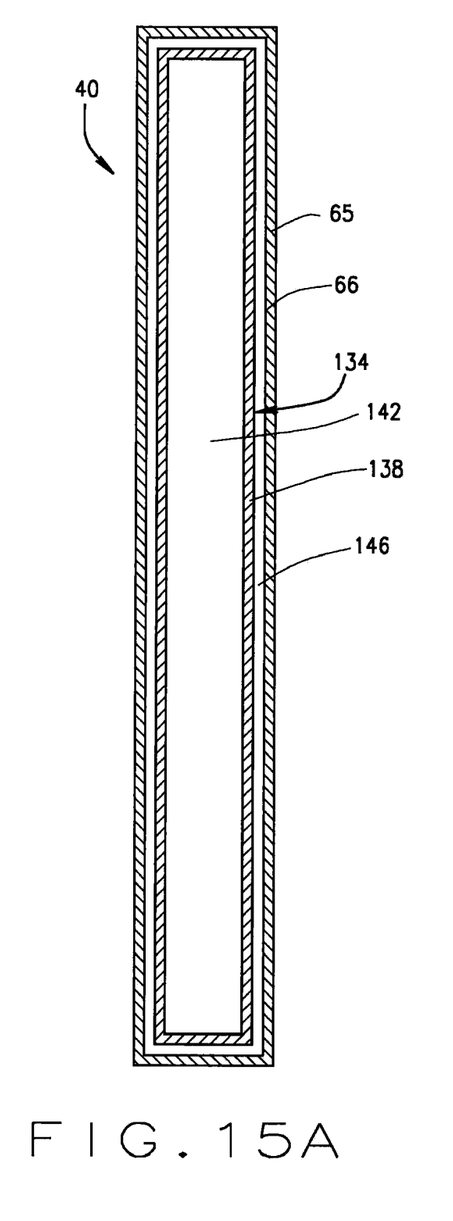
FIG. 15A is an exemplary longitudinal cross-sectional view of the central body shown in FIG. 5, having a double containment construction, in accordance with various embodiments of the present disclosure.
Figure 15B:
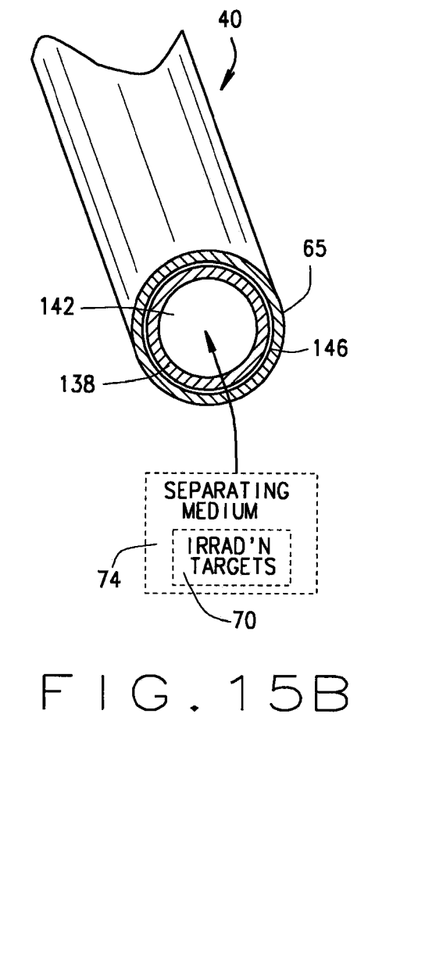
FIG. 15B is an exemplary redial cross-sectional view of the central body shown in FIG. 15A, in accordance with various embodiments of the present disclosure.

Referring now to FIGS. 15A and 15B, in various embodiments, one or more of the central bodies 40 of one or more of the isotope production target rods 20 can have a double containment construction to provide an additional level of protection against radiation leakage from faulty welds are breaching of the integrity of the central bodies 40 due to fretting or wear on the central bodies 40 during reactor operation. More particularly, in various embodiments, one or more of the central bodies 40 within one or more of the isotope production target rods 20 can include an irradiation target canister 134 concentrically positioned within the internal cavity 66. The irradiation target canister 134 includes an outer shell 138 that defines an internal cavity 142 for retaining the irradiation targets 70, e.g., the disks 78 and/or the pellets 90, and the separating medium 74, e.g., the spacers 82 and/or the target receptacle(s) 98, in the same manner as described above with regard to FIGS. 5 through 14.

That is, the irradiation targets 70 can be positioned and retained within the internal cavity 142 of the irradiation target canister 134 in the particular spatial arrangement utilizing the low nuclear cross-section separating medium 74 in the same manner and utilizing the same structures, substances, and materials as described above in the various embodiments regarding the internal cavity 66 of the central body 40 illustrated in FIGS. 5 through 14.

In various embodiments, an interstitial space 146 can exist between an inner wall of the cavity 66 and the irradiation target canister 134. The interstitial space 146 allows for thermal expansion of the irradiation target canister 134. In various implementations, the interstitial space 146 can be backfilled with a substantially zero nuclear cross-section, high thermal conductivity gas, such as helium to provide high thermal conductivity to remove heat from the irradiation target canister 134 while presenting no impedance to the neutron flux of the power generating nuclear reactor core 10. Additionally, in various embodiments, the irradiation target canister outer shell 138 can be fabricated from a low nuclear cross-section material such as zirconium, aluminum or any other suitable material or, substance that has a low nuclear cross-section.

Although the irradiation target disks 78, separating medium spacers 82, irradiation target pellets 90, target receptacles 98 and the irradiation target canister 134 have been generally described and illustrated herein as having cylindrical shapes, i.e., round or circular cross-sectional geometries, it should be understood that each of the irradiation target disks 78, separating medium spacers 82, irradiation target pellets 90, target receptacles 98 and the irradiation target canister 134 can have cross-sectional geometries other than cylindrical of circular and remain within the scope of the disclosure. For example, it is envisioned that each of the irradiation target disks 78, separating medium spacers 82, irradiation target pellets 90, target receptacles 98 and the irradiation target canister 134 can have square, triangular, rectangular, hexagonal, octagonal, trapezoidal cross-sectional geometries, or any other suitable cross-sectional geometry and remain within the scope of the disclosure. More particularly, it should be understood that the cross-sectional geometries for some or all of the irradiation target disks 78, separating medium spacers 82, irradiation target pellets 90, target receptacles 98 and the irradiation target canister 134 can be different than that of some or all of the respective irradiation target disks 78, separating medium spacers 82, irradiation target pellets 90, target receptacles 98 and the irradiation target canister 134. For example, an isotope production target rod 20 can be constructed having irradiation targets with a hexagonal cross-section retained within the reservoirs 94 of an irradiation target receptacle 98 having a triangular cross-section that is housed within an irradiation target canister 134 with a square cross-section, or any other possible combination of cross-sectional geometries.

It should be understood that, although the terms first, second, third, etc., may be used herein to describe various elements, components, regions and/or sections, these elements, components, regions and/or sections should not be limited by these terms. These terms may be only used to distinguish one element, component, region or section from another component, region or section.

Additionally, spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Furthermore, the terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, components, etc., but do not preclude the presence or addition of one or more other features, integers, steps, operations, elements, components, groups, etc., thereof.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed is:

1. An isotope production target rod for a light water nuclear power reactor, said isotope production target rod comprising:
    at least one rod central body including an outer shell that defines an internal cavity, the at least one rod central body configured to be inserted into the light water nuclear power reactor;
    a plurality of irradiation targets within the internal cavity, the irradiation targets not being nuclear fuel; and
    a low nuclear cross-section separating medium separating each of the irradiation targets from each other and positioning each of the irradiation targets in a spatial arrangement, the low nuclear cross-section separating medium having a neutron absorption cross-section less than about 1 barn for neutrons produced through nuclear fission in the light water nuclear power reactor and incident on the separating medium; and wherein
    the irradiation targets and the low nuclear cross-section separating medium are not disposed in a container within the rod central body; and
    the separating medium comprises at least one irradiation target receptacle within the internal cavity of each respective rod central body, each irradiation target receptacle including a plurality of target reservoirs in a pattern within at least a portion of an outer surface of each irradiation target receptacle.

2. The isotope production target rod of claim 1, wherein each target reservoir is sized to retain a single irradiation target.

3. The isotope production target rod of claim 1, wherein each target reservoir is sized to retain the respective target in a particular orientation.

4. The isotope production target rod of claim 2, wherein each target reservoir is sized to retain the respective target in a random orientation.

5. The isotope production target rod of claim 1, wherein each irradiation target receptacle is fabricated of at least one of zirconium and aluminum.

6. The isotope production target rod of claim 1, wherein each irradiation target receptacle comprises a solid body having the target reservoirs in the pattern along the at least a portion of an outer surface of the solid body.

7. The isotope production target rod of claim 6, wherein the target reservoirs are equally spaced around the body outer surface between opposing axial end portions of the body outer surface such that each target reservoir is a substantially equal distance from each adjacent target reservoir.

8. The isotope production target rod of claim 6, wherein the target reservoirs are equally spaced about at least one of opposing axial end portions of the body outer surface such that each target reservoir is a substantially equal distance for each adjacent target reservoir.

9. The isotope production target rod of claim 6, wherein each irradiation target receptacle comprises an axially threaded bore in at least one axial end portion.

10. The isotope production target rod of claim 1, wherein each irradiation target receptacle comprises a tubular body having the target reservoirs in the pattern equally spaced around an outer surface.

11. The isotope production target rod of claim 10, wherein the tubular body includes a longitudinal center cavity therethrough, the axial bore having threads in at least one axial end portion.

12. The isotope production target rod of claim 1, wherein each irradiation target receptacle comprises:
 a perforated tubular sleeve having a plurality of holes therein in the pattern; and
 a solid core fitted within the sleeve.

13. An isotope production target rod for a light water nuclear power reactor, comprising:
 at least one rod body including an outer shell that defines an internal cavity, the at least one rod body configured to be inserted into the light water nuclear power reactor;
 a separating structure disposed within the cavity that defines separate target spaces;
 a plurality of irradiation targets, the plurality of irradiation targets not being nuclear fuel, each of the plurality of irradiation targets being disposed in a different one of the target spaces such that the plurality of irradiation targets are separated from each other by the separating structure, and the irradiation targets not being disposed in a separate container within the rod body.

14. An isotope production target rod for a light water nuclear power reactor, comprising:
 at least one rod body including an outer shell that defines an internal cavity, the at least one rod body configured to be inserted into the light water nuclear power reactor;
 a cylinder disposed in the cavity of at least one of the rod bodies, the cylinder having a plurality of reservoirs formed in an outer lateral surface thereof;
 a plurality of irradiation targets, each irradiation target disposed in a different one of the plurality of reservoirs such that the plurality of irradiation targets are separated from one another, and each irradiation target not being nuclear fuel, wherein at least one of the plurality of reservoirs has an elliptical cross-section.

15. The isotope production target rod of claim 14, further comprising:
 a target container within the cavity of the at least one of the rod bodies, and the cylinder being disposed in the target container.

16. A fuel bundle for a light water nuclear power reactor, comprising:
 a plurality of fuel rods;
 at least one isotope production rod as recited in claim 1;
 a plurality of spacer grids maintaining the plurality of fuel rods and the isotope production rod in a spaced relationship in the light water nuclear power reactor; and
 an outer channel housing the plurality of fuel rods, the isotope production rod and the plurality of spacer grids.

17. The fuel bundle of claim 16, further comprising:
 an upper tie plate;
 a lower tie plate; and wherein
 the plurality of fuel rods and the isotope production rod are disposed between the upper and lower tie plates.

* * * * *